July 19, 1966 H. K. A. DE LANGE 3,261,525

TAPE GUIDE FOR VIDEO DRUM

Filed June 16, 1964

INVENTOR.
HERMAN K.A. DE LANGE
BY
Frank R. Trifari
AGENT

United States Patent Office 3,261,525

Patented July 19, 1966

3,261,525

TAPE GUIDE FOR VIDEO DRUM

Herman Kasper Adriaan de Lange, Klosternenburg, Austria, assignor to North American Philips Company, Inc., New York, N.Y., a corporation of Delaware Filed June 16, 1964, Ser. No. 375,607

Claims priority, application Austria, June 19, 1963, A 4,911

3 Claims. (Cl. 226—199)

The invention relates to a drum for use in apparatus for recording and/or reproducing signals particularly signals having a wide frequency spectrum, in which a record carrier (tape) is wound helically on the cylindrical outer surface of a drum having studs protruding from the said surface, on at least one side of the path of the record carrier for laterally guiding the tape. Such a drum is used, for example, in recording and/or play-back apparatus for video information. Since in such apparatus the tracks recorded on the record carrier usually are very narrow and form lines running close to one another obliquely across the record carrier, the path of the tape on the drum is of great importance because recording or play-back takes place while the tape is on the drum. Hence it is necessary to provide tape guide members which are distributed along the periphery of the drum and laterally guide the record carrier.

For this purpose in a known apparatus (French Patent 1,265,219, May 23, 1961), fixed studs are inserted in the outer surface of a drum laterally of the path of the record carrier, the ends of the studs protruding from the said surface laterally guiding the record carrier. It will be appreciated that the position of the studs on the drum relative to the path of the record carrier must be determined with a high degree of accuracy without adversely affecting tracking of the tape and this provides considerable difficulty in the manufacture of such drums.

The invention provides a particularly simple and readily practicable method of adjustably mounting said studs on the outer cylindrical surface of the drum. The invention is characterized in that the ends of the studs protruding from the drum surface are bent to form hooks and are secured to the drum surface outside the path of the record carrier. The hooked end of each stud extends into a recess in the said drum surface which form lateral guides for the studs and extend substantially transverse to the path of the record carrier and into the said path. Such a drum may readily be made by mass production methods because all the critical tolerances can be simply compensated for.

The invention will now be described in greater detail with reference to the accompanying drawing in which.

Figure 1:
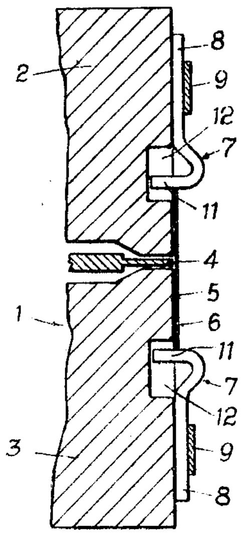
FIG. 1 is a section view of a drum having guides according to the invention.

In FIGURE 1 a drum 1 comprises drum halves 2 and 3 between which are disposed rotating recording and/or playback heads 4. A record carrier 6 is wound helically on the cylindrical outer surface 5 of the drum. The record carrier is laterally guided by hooked studs 7 the shank ends 8 of which are secured to the said drum surface by securing members 9. In the embodiment shown in FIGURES 1 and 2 the said securing member 9 takes the form, for example, of a lug adapted to be secured to the said surface by means of a screw 10. The other end 11 of each stud 7 extends into a recess 12 in the said drum surface, if desired, to the bottom of the recess to be supported thereby. The recesses 12 extend substantially, transverse to the path of the record carrier and into the said path. The sides 13 and 14 of recesses 12 serving to guide the studs 7 laterally so that the end 11 of each stud 7 can only be moved substantially transverse to the path of the record carrier; along the path of the record carrier any desired number of such recesses and studs may be provided. If desired, the recesses and studs may be provided on one side only of the path of the record carrier so that the latter is guided on one side only.

Figure 2:
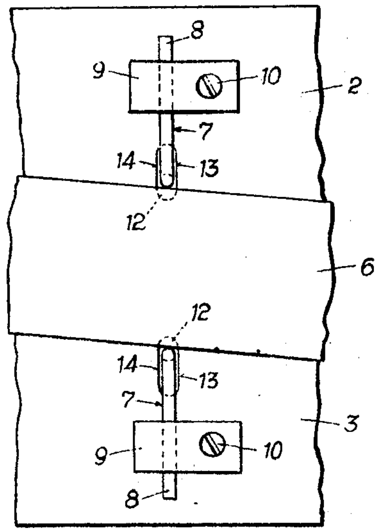
FIG. 2 is a side elevational view of the apparatus shown in FIG. 1.

The described arrangement of the studs 7 enables them to be readily adjusted to the position required for accurate guidance of the tape. A record carrier or tape 6 may be wound on the drum in the desired manner after which the studs 7 in the recesses 12 are adjusted until they come into contact with the record carrier and are then locked in position by means of the securing members 9, alternatively a gauge may be substituted for the record carrier. The studs 7 are preferably made of hard steel so as to be resistant to wear by the record carrier. Obviously it is not necessary for the studs to be arranged opposite one another on a generatrix of the cylindrical outer surface of the drum, as is shown in FIGURES 1 and 2, but they may be staggered. The tape guide arrangement in accordance with the invention always ensures faultless running of the tape on the drum since the recessed studs or guide members cannot impede or obstruct the running tape.

Figure 3:
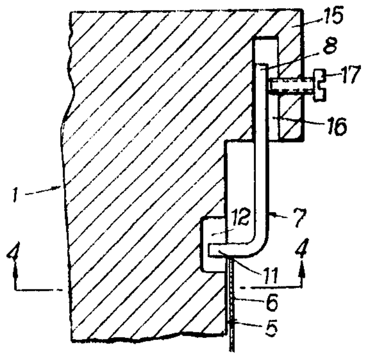
FIG. 3 shows another embodiment of the invention in a partial sectional view similar to FIG. 1.
Figure 4:
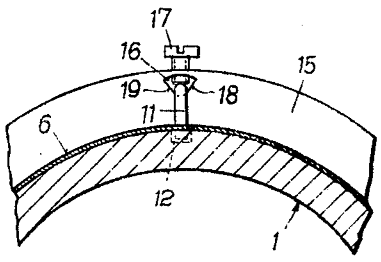
FIG. 4 is a view taken on line 4—4 of FIG. 3 looking in the direction of the arrows.

A particularly advantageous method of securing the studs to the outer cylindrical surface of the drum is shown in FIGURE 3. For this purpose the drum 1 is provided with a raised part 15 along the path of the record carrier 6. Bores 16 are provided in the said raised part 15. The bores 16 may be of cylindrical cross-section or, as is shown in FIGURE 4, they may advantageously have two surfaces 18 and 19 inclined to one another in the manner of the limbs of a V which are engaged by the locked end of the stud 7. Obviously bores 16 may be extended through part 15. The ends 8 of the studs 7 are inserted into the bores 16. The other ends 11 of the studs are arranged in the recesses 12 in the cylindrical outer surface of the drum. The essential feature is that the axes of the bores 16 extend parallel to the longitudinal axes of the corresponding recesses 12 to permit ready displacement of the studs 7 in the recesses 12. The studs 7 may advantageously be secured by means of locking screws 17 extending into the bores 16. One of the advantages of the said embodiment is that the bores 16 also guide the studs 7 and the operation of locking the studs causes no change in their position.

Obviously other means for securing the studs to the cylindrical outer surface of the drum known to a person skilled in the art may be used without departing from the scope of the invention. The shape of the studs also may be modified in a variety of ways.

What is claimed is:

1. Apparatus in which a cylindrical drum is provided having a path over which a record carrier, which is helically wound on the outer surface of said drum is passed, the improvement comprising a plurality of stud means protruding from said drum surface along at least one side of said path, a plurality of recesses in said drum surface along at least said one side of said path for laterally guiding said studs, said recesses extending transversely of the said path and having a portion thereof in said path, said stud means having a shank portion remote from said path and a hook portion adjacent said path, said hook portion of each stud terminating in one of said recesses, and means connected with said drum surface engaging the shank portion of said studs for movably securing each of said studs on said drum surface.

2. Apparatus according to claim 1 wherein said means engaging said shank portion of said studs comprises a raised portion connected with said drum surface at least at one side of said path and remote therefrom, a plurality of bores in said raised portion, each said bore receiving a shank portion of one of said studs, said bores being axially aligned with the longitudinal axis of a corresponding one of said recesses and locking screw means connected with said raised portions for extending into each of said bores.

3. Apparatus as claimed in claim 2, wherein each said bore has two flat surfaces which are inclined relative to one another in the manner of the limbs of a V for engaging the stud shank.

References Cited by the Examiner

UNITED STATES PATENTS 328,297 10/1885 Dayton ____________ 242—118.5

FOREIGN PATENTS 1,265,219 5/1961 France.